(12) United States Patent
Pelletier

(10) Patent No.: US 9,862,386 B2
(45) Date of Patent: Jan. 9, 2018

(54) CONTROL METHOD, COMPUTER PROGRAM AND CONTROL DEVICE OF A TRACKED VEHICLE

(71) Applicant: Snowgrolic S.AR.L., Luxembourg (LU)

(72) Inventor: Martin Pelletier, Quebec (CA)

(73) Assignee: PRINOTH S.P.A., Vipiteno (IT)

( * ) Notice: Subject to any disclaimer, the term of this patent is extended or adjusted under 35 U.S.C. 154(b) by 28 days.

(21) Appl. No.: 14/402,056

(22) PCT Filed: May 28, 2013

(86) PCT No.: PCT/EP2013/060993
§ 371 (c)(1),
(2) Date: Nov. 18, 2014

(87) PCT Pub. No.: WO2013/178642
PCT Pub. Date: Dec. 5, 2013

(65) Prior Publication Data
US 2015/0134221 A1    May 14, 2015

(30) Foreign Application Priority Data

May 28, 2012 (IT) .............................. M12012A0922

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *B60W 30/18* | (2012.01) |

(Continued)

(52) U.S. Cl.
CPC ....... *B60W 30/18172* (2013.01); *B60K 23/00* (2013.01); *B62D 11/003* (2013.01); *B62D 11/02* (2013.01); *B62D 55/00* (2013.01); *B62D 55/06* (2013.01)

(58) Field of Classification Search
CPC ...................... B60W 2300/45; B60W 2300/44
See application file for complete search history.

(56) References Cited

U.S. PATENT DOCUMENTS

| 5,787,374 A | 7/1998 | Ferguson et al. | |
|---|---|---|---|
| 6,141,613 A * | 10/2000 | Fan ........................ | B62D 11/08 180/6.7 |

(Continued)

FOREIGN PATENT DOCUMENTS

DE     4224359     5/1993

OTHER PUBLICATIONS

International Search Report and Written Opinion for International Application No. PCT/EP2013/060993 dated Oct. 2, 2013.

(Continued)

*Primary Examiner* — Lail Kleinman
(74) *Attorney, Agent, or Firm* — Neal, Gerber & Eisenberg LLP

(57) ABSTRACT

A control method of a tracked vehicle having a track belt and configured to advance the tracked vehicle provides for acquiring the driving speed of the tracked vehicle; acquiring the speeds of the tracks with respect to the tracked vehicle; calculating a range of expected values of traveling speed as a function of speed of the track; and varying the speed of the track when the traveling speed of the tracked vehicle is outside the range of expected values.

20 Claims, 2 Drawing Sheets

(51) Int. Cl.
  *B62D 55/06*  (2006.01)
  *B62D 11/02*  (2006.01)
  *B62D 55/00*  (2006.01)
  *B62D 11/00*  (2006.01)
  *B60K 23/00*  (2006.01)

(56) References Cited

U.S. PATENT DOCUMENTS 6,377,881 B1 * 4/2002 Mullins ................ A01B 69/008
                                                                172/2
2002/0156574 A1 * 10/2002 Fortin ................ G01C 21/3626
                                                                701/420

OTHER PUBLICATIONS

Notification Concerning Submission, Obtention or Transmittal of Priority Document (Form PCT/IB/304) for International Application No. PCT/EP2013/060993 dated Aug. 21, 2013.

* cited by examiner

CONTROL METHOD, COMPUTER PROGRAM AND CONTROL DEVICE OF A TRACKED VEHICLE

PRIORITY CLAIM

This application is a national stage application of PCT/EP2013/060993, filed on May 28, 2013, which claims the benefit of and priority to Italian Patent Application No. MI2012A000922, filed on May 28, 2012, the entire contents of which are each incorporated by reference herein.

BACKGROUND

Certain known tracked vehicles generally comprise two tracks paired and configured to advance and steer the tracked vehicle; a motor, such as an internal combustion engine, and two power transmissions to transfer the power from the motor to the respective tracks. The power transmissions are of the electromechanical or hydraulic type and can be adjusted independently of each other for steering the tracked vehicle.

The tracked vehicles of the above-identified type are often found to work on slippery layers of soil or loose snow and along very steep slopes. Under these conditions even the tracks can lose traction, slip and compromise the possibility of traveling in a speedy and effective manner. Moreover, the loss of adherence causes other side effects such as, for example, energy dissipation, track wear and possible damage to the tracks.

SUMMARY

The present disclosure relates to a method, a program for electronic processor, a control device of a tracked vehicle and a tracked vehicle.

In particular, the present disclosure relates to a method, a computer program and a control device for controlling a tracked vehicle used for the preparation of ski runs or to operate in the maintenance of woods.

The purpose of the present disclosure is to provide a control method of a tracked vehicle to alleviate certain of the drawbacks of certain of the prior art systems.

In accordance with the present disclosure, there is provided a control method of a tracked vehicle, in particular a tracked vehicle for the preparation of ski runs or for the maintenance of woods, and comprising a track configured to advance the tracked vehicle. The control method of the disclosure comprises the steps of acquiring the traveling speed of the tracked vehicle; acquiring the speed of the track with respect to the tracked vehicle; calculating a range of expected values of traveling speed as a function of the speed of the track; and varying the speed of the track when the traveling speed of the tracked vehicle is outside the range of expected values.

Accordingly, the variation of the speed of the track causes a variation of the range of expected values of the traveling speed and possibly a change of the traveling speed. In the absence of slip and along a straight path, the theoretical traveling speed corresponds to the speed of the track. This theoretical condition is hardly found in reality and it is therefore appropriate to calculate a range of expected values of traveling speed which, in the case of a tracked vehicle advancing along a straight path, can be defined as a relative to the speed of the track.

According to certain embodiments of the present disclosure, the tracked vehicle includes two tracks configured to be operated at respective speeds with respect to the tracked vehicle, the method comprising the steps of acquiring the speed of the tracks with respect to the tracked vehicle, and calculating the range of expected values as a function of the speed of the tracks.

In this case the theoretical traveling speed in the absence of slippage is given or designated by the composition of the speeds of the tracks, and the range of expected values of speed can be calculated as a range relative to the theoretical traveling speed.

Acquiring both speeds of the tracks makes possible to apply the method of the present disclosure when the tracked vehicle is under steering.

According to certain embodiments of the present disclosure, the method provides for acquiring a steering signal configured to vary the speed of the tracks from each other; and calculating the range of expected values as a function of the steering signal.

The steering signal has the function of providing further information regarding the commands given to the tracks. When the steering signal is indicative of high values of steering angles, the range of expected values is amplified because the slippage of the tracks during steering is necessary.

According to certain embodiments of the present disclosure the method provides for acquiring a signal indicative of the longitudinal tilt of the tracked vehicle; and calculating the range of expected values as a function of the signal indicative of the longitudinal tilt.

It should be appreciated that it is possible to vary the width of the range of expected values based on the information of signal indicative of the longitudinal tilt. For example, during the ascent of the vehicle, the range of expected values will be relatively small or narrow while in the descent phase of the vehicle, the range of expected values will be relatively large or wide to avoid varying the speed of the track during descent. It should be appreciated that in certain embodiments, during descent, the variation of the speed of the track is excluded.

In certain embodiments, the method provides for cyclically reiterating the calculation of the range of expected values.

The reference parameter, the range of expected values is a dynamic parameter that needs to be updated in real time.

The present disclosure relates to a computer program configured to control a tracked vehicle.

In accordance with the present disclosure the steps of the method of the disclosure are directly loadable into a memory of a computer to carry out the method steps when the program is implemented by the electronic processor.

Such a program provides that the method can be actuated in a simple and economical manner.

Furthermore, the present disclosure relates to a program product comprising a readable medium on which the program is stored.

An advantage of the present disclosure relates to a control device that is able to overcome certain of the drawbacks of the prior art.

In accordance with the present disclosure certain of there is provided a control device of a tracked vehicle, in particular a tracked vehicle for the preparation of ski runs or for the maintenance of woods, comprising a track configured to advance the tracked vehicle. The control device is configured to acquire the traveling speed of the tracked vehicle; acquire the speed of the track with respect to the tracked vehicle; calculate a range of expected values of traveling speed as a function of the speed of the track, and vary the speed of the track when the traveling speed of the tracked vehicle is outside the range of expected values.

In various embodiments, the control device has a computer and channels of data acquisition and data output.

In certain embodiments, the control device comprises a sensor mounted on the tracked vehicle and configured to detect the relative movement of the track with respect to the tracked vehicle and acquire the speed of the track, and a GPS receiver mounted on the tracked vehicle for acquiring the traveling speed of the tracked vehicle.

In addition, the tracked vehicle includes a motor for the generation of power and two power transmissions adjustable and configured to transfer part of engine power to the respective tracks. The control device is configured to adjust the power transmissions to modulate the power transmitted to the respective tracks, and vary the speed of the tracks.

The present disclosure finds particular application for tracked vehicles for the preparation of slopes or for tracked vehicles for the maintenance of forests.

Additional features and advantages are described in, and will be apparent from the following Detailed Description and the figures.

BRIEF DESCRIPTION OF THE DRAWINGS

Other features and advantages of the present disclosure will become clear from the following description of one of its non-limiting embodiment, with reference to the accompanying drawings, wherein.

DETAILED DESCRIPTION

Figure 1:
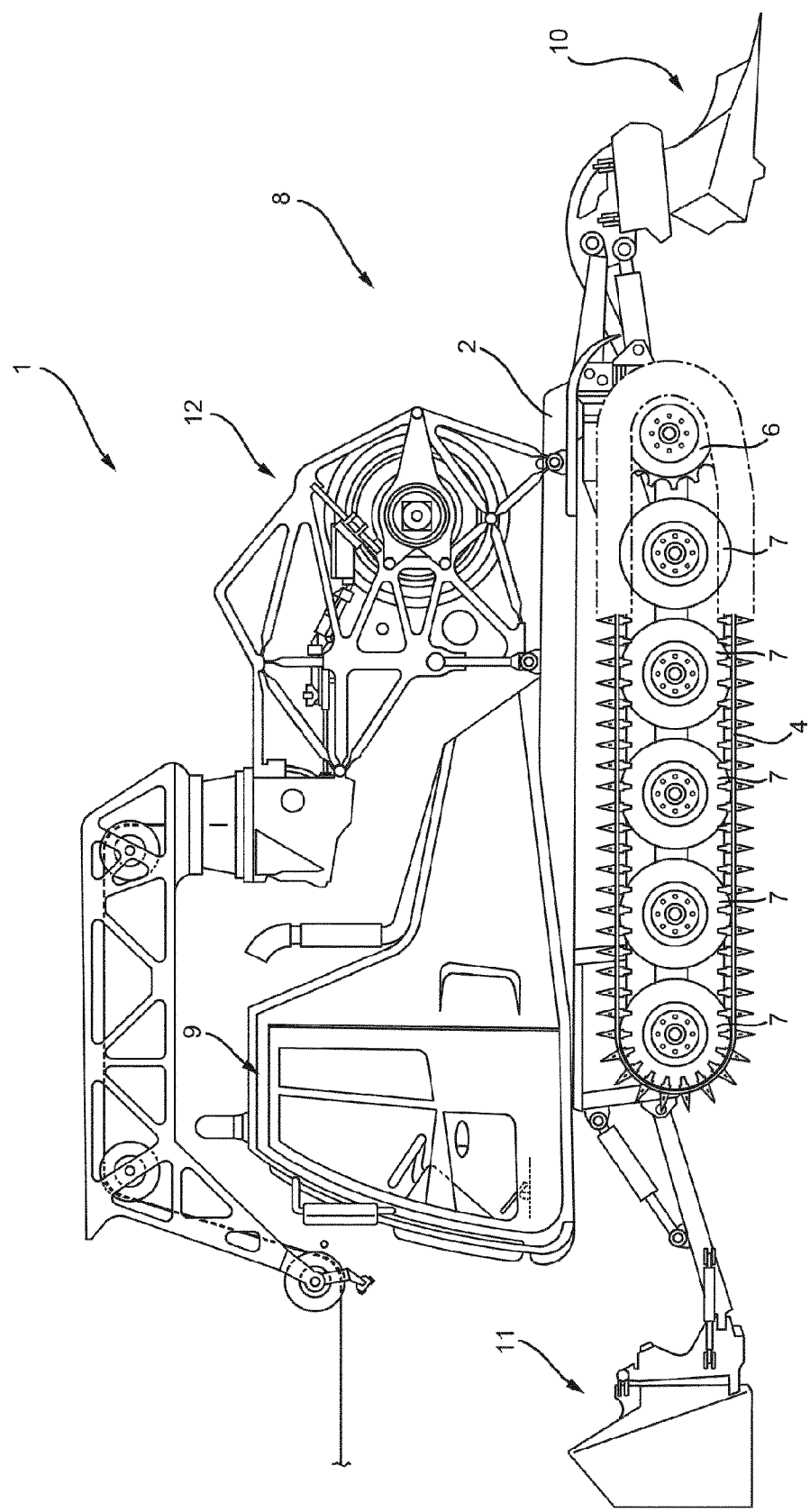
FIG. 1 is a side elevation view, with parts removed for clarity, of a tracked vehicle used for the preparation of the ski runs and made in accordance with the present disclosure.
Figure 2:
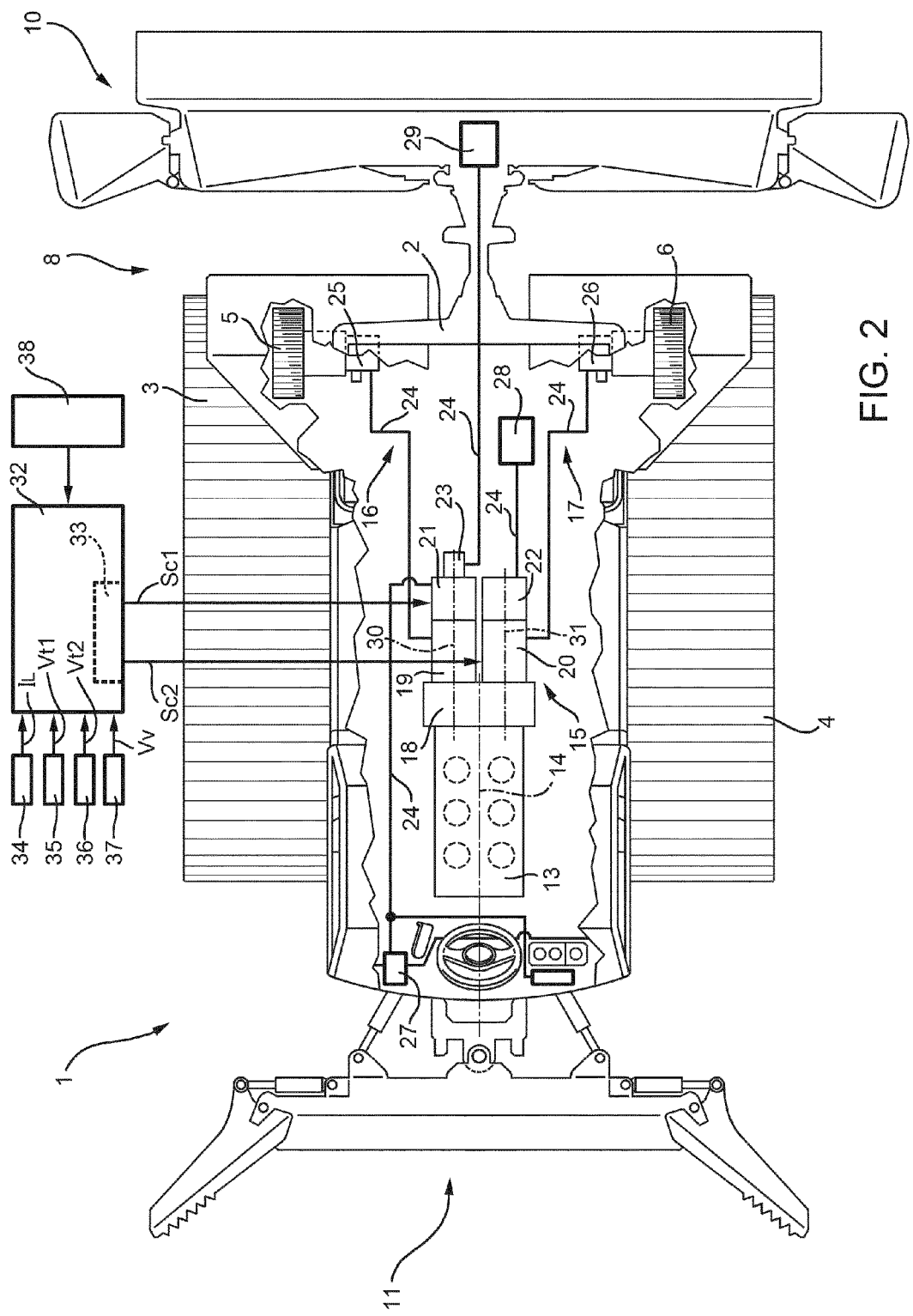
FIG. 2 is a plan view, with parts removed for clarity and parts shown in a schematic way, the tracked vehicle of FIG. 1.

Referring now to the example embodiments of the present disclosure illustrated in FIGS. 1 to 2, with reference to FIG. 1, number 1 is defined as a whole tracked vehicle for the preparation of ski slopes. The tracked vehicle 1 comprises a frame 2; a track 3 (FIG. 2); a track 4; a driving wheel 5 (FIG. 2) and a drive wheel 6; guide wheels 7 of the tracks 3 (FIG. 2) and 4; a group of equipment 8 configured to absorb power and perform work, and a driving cab 9. The drive wheels 5 (FIG. 2) and 6 are operated independently from one another and are coupled respectively to the track 3 (FIG. 2) and the track 4.

In the present case and with reference to FIG. 2, the group of equipment 8 comprises a tilling tool 10, a blade 11, and a winch 12 (FIG. 1). The tracked vehicle 1 comprises an internal combustion engine 13 having a motor shaft 14; a power transmission assembly 15 operatively connected to the motor shaft 14 and adapted to connect the internal combustion engine 13 to the drive wheels 5 and 6 and to the group equipment 8. In this case, the internal combustion engine 13 is a diesel engine, which is known to be configured for providing a power as a function of the number or quantity of revolutions. The power transmission assembly 15 as a whole comprises, in this case, a power transmission 16 dedicated to the track 3 and the driving wheel 5 and a power transmission 17 dedicated to the track 4 and the driving wheel 6 and other power transmission dedicated to the tiller 10; the blade 11; and the winch 12 (FIG. 1).

In the example shown in FIG. 2, the power transmission assembly 15 is of the hydraulic type and includes a mechanical transmission 18, five pumps 19, 20, 21, 22 and 23, hydraulic conduits 24, such as hydraulic conduits of the flexible type, and five hydraulic actuators 25, 26, 27, 28 and 29.

The mechanical transmission 18 is coupled to motor shaft 14 and has two output shafts 30 and 31. In particular, the shaft 30 and shaft 31 are in turn coupled respectively to a first group of pumps, comprising the pumps 19, 21, 23 and a second group of pumps, comprising the pumps 20, 22 to transmit the motion received from the motor shaft 14.

Each pump 19, 20, 21, 22 and 23, via hydraulic lines 24, is coupled respectively to one of the hydraulic actuators 25, 27, 26, 28 and 29 associated with the respective devices 8.

Through a suitable control of the pumps 19, 20, 21, 22 and 23 it is possible to control the hydraulic actuators 25, 27, 26, 28 and 29 and, thus, also the driving wheels 5 and 6 and the group of equipment 8.

In the example shown, the power transmission 16 includes the pump 19, conduit 24 and the motor 25, while the power transmission 17 includes the pump 20, conduit 24 and the motor 26.

Although the present description makes specific reference to a power transmission of the hydraulic type, the hydraulic transmission can be replaced by a transmission of the electromechanical type, or the various dedicated transmission can include transmissions of the hydraulic type and of the electromechanical type. In the transmission power of the electromechanical type are used for electrical machines able to operate as electric generators and as electric motors.

In accordance with the present disclosure, the tracked vehicle 1 comprises a control device 32, which has the function to reduce and/or cancel slippage of the tracks 3 and 4. In particular, the control device 32 is configured to acquire the traveling speed VV of the tracked vehicle 1; acquire the speed VT1 and VT2 of the tracks 3 and 4 relative to the tracked vehicle 1; calculate a range of expected value as a function of the speed VT1 and VT2 of tracks 3 and 4; and vary the speed VT1 and VT2 of the tracks 3 and 4 when the traveling speed VV is outside the range of expected values.

In particular, the control device 32 is configured to reduce the speed VT1 and VT2 of the tracks 3 and 4 in case of loss of adherence of the tracks 3 and 4 in given or designated operating conditions that determine the anti-skid operating mode.

For example, the control device 32 is configured to acquire a signal indicative of the longitudinal tilt of the tracked vehicle 1, and calculate the range of expected values as a function of the signal indicative of the longitudinal tilt of the tracked vehicle 1. In this way, slippage of tracks 3 and 4 can be reduced when the tracked vehicle 1 ascents relatively very steep slopes. On the contrary, in the descent phase, slippage of the tracked vehicle 1 does not cause particular problems. Consequently, from a practical point of view, the magnitude of the signal indicative of the longitudinal tilt IL is a parameter that enables admitting or excluding anti-skid operation mode. In certain embodiments, this mode is also excluded when the tracked vehicle 1 is under steering, in particular when the tracked vehicle performs the steering with a relatively small radius of curvature. In practice, the control device 32 is configured to receive a steering signal SS imparted by the driver of tracked vehicle 1. From a practical point of view, the control device 32 is configured to calculate the range of expected values as a function of the steering signal SS.

The control device 32 comprises a computer 33; a sensor 34, in this case an inclinometer, to detect the signal indicative of the longitudinal tilt of the tracked vehicle 1; two sensors 35 and 36 configured to detect movement between two parts in relative motion as encoder, inductive sensors, capacitive etc., to respectively detect the speed VT1 and VT2, and a sensor 37, for example a GPS receiver, configured to acquire the position and the traveling speed VV of the tracked vehicle 1. In certain embodiments, the sensors 35 and 36 are mounted on the frame 2. In various embodiments, the sensors 35 and 36 are arranged in the vicinity of the tracks 3 and 4, respectively, or, in the vicinity of the driving wheels 5 and 6.

The control device 32 includes a user interface 38, through which it is possible to send commands to the electronic processor 33 for voluntarily inhibiting anti-skid operation mode of the tracks 3 and 4.

The control device 32 is configured to vary the speed VT1 and VT2 of the tracks 3 and 4, when they occur under certain circumstances. From an operational point of view it is convenient to configure the control device 32 to reduce the power transmitted along the power transmission 16 and 17 dedicated to the drive of the tracks 3 and 4 and of the respective drive wheels 5 and 6. In particular, the power reduction is achieved by operating the pumps 19 and 20 by appropriate signals emitted by the control device 32. The pumps 19 and 20 are variable eccentricity pumps and it is thus possible to vary the power transmitted by varying the value of eccentricity of the same.

In the case where the transmission is of the electromechanical type, adjusting the transmitted power is obtained by adjusting the electric generators utilizing a suitable inverter.

The electronic processor 33 is configured to implement a program for data acquisition and calculation methods for emitting two control signals SC1 and SC2 configured to control power transmissions 16 and 17. The electronic processor 33 can be programmed directly or is configured to read media program utilizing a special interface.

In certain embodiments, the control signals SC1 and SC2 are directly proportional to the amount of slippage of the tracks 3 and 4. In this way, it is possible to intervene directly on the slip of each track. The control device 32 operates in a close loop mode and in the event of persistence of excessive slippage of at least one of the tracks 3 and 4, the operations described are reiterated up to reduce the amount of slip within acceptable values.

The scope of protection of the present disclosure is defined by the claims that cover not explicitly described variants and equivalent embodiments. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of controlling a tracked vehicle including a track configured to advance the tracked vehicle, said method comprising:
   acquiring a traveling speed of the tracked vehicle;
   acquiring a speed of the track with respect to the tracked vehicle;
   acquiring a signal indicative of a longitudinal tilt of the tracked vehicle;
   determining, based on the acquired signal indicative of the longitudinal tilt of the tracked vehicle, an operating condition; and
   responsive to the determined operating condition being deterministic of an anti-skid operating mode:
      for the determined operating condition, calculating a range of expected traveling speeds as a function of the acquired speed of the track, wherein a first determined operating condition associated with an ascent of the tracked vehicle has a first range of expected travelling speeds as a function of the acquired speed of the track and a second, different determined operating condition associated with a descent of the tracked vehicle has a second, greater range of expected travelling speeds as a function of the acquired speed of the track; and
      varying the speed of the track when the acquired traveling speed of the tracked vehicle is outside the calculated range of expected traveling speeds to reduce slippage of the track.

2. The method of claim 1, wherein the tracked vehicle includes two tracks configured to be driven at respective speeds with respect to the tracked vehicle and which includes:
   acquiring the speeds of the tracks with respect to the tracked vehicle, and
   calculating the range of expected traveling speeds as a function of the acquired speeds of the tracks.

3. The method of claim 2, which includes:
   acquiring a steering signal to differentiate the speeds of the tracks from one another; and
   calculating the range of expected traveling speeds as a function of the acquired steering signal.

4. The method of claim 3, wherein the tracked vehicle includes a motor configured to generate power and two adjustable power transmissions configured to transfer part of the generated power of the motor to the respective tracks, and which includes adjusting the two respective power transmissions to modulate the power transmitted to the respective tracks.

5. The method of claim 1, which includes calculating the range of expected traveling speeds as a function of the acquired signal indicative of the longitudinal tilt.

6. The method of claim 1, which includes cyclically reiterating the calculation of the range of expected traveling speeds.

7. The method of claim 1, wherein acquiring the speed of the track includes detecting the speed via a sensor mounted on the tracked vehicle, said sensor configured to detect a relative movement of the track with respect to the tracked vehicle.

8. The method of claim 1, wherein acquiring the traveling speed of the tracked vehicle includes acquiring the traveling speed of the tracked vehicle through a GPS receiver.

9. The method of claim 1, wherein the tracked vehicle is associated with one selected from the group consisting of: a preparation of ski slopes and a maintenance of woods.

10. A non-transitory computer readable medium including a plurality of instructions, which when executed by at least one processor, cause the at least one processor to control a tracked vehicle by:
   acquiring a traveling speed of the tracked vehicle;
   acquiring a speed of a track of the tracked vehicle with respect to the tracked vehicle, said track configured to advance the tracked vehicle;
   acquiring a signal indicative of a longitudinal tilt of the tracked vehicle;

determining, based on the acquired signal indicative of the longitudinal tilt of the tracked vehicle, an operating condition; and responsive to the determined operating condition being deterministic of an anti-skid operating mode:

for the determined operating condition, calculating a range of expected traveling speeds as a function of the acquired speed of the track, wherein a first determined operating condition associated with an ascent of the tracked vehicle has a first range of expected travelling speeds as a function of the acquired speed of the track and a second, different determined operating condition associated with a descent of the tracked vehicle has a second, greater range of expected travelling speeds as a function of the acquired speed of the track; and varying the speed of the track when the acquired traveling speed of the tracked vehicle is outside the calculated range of expected traveling speeds to reduce slippage of the track.

11. A tracked vehicle control device comprising:
a processor; and
a memory device which stores a plurality of instructions, which when executed by the processor, cause the processor to:
acquire a traveling speed of a tracked vehicle,
acquire a speed of a track of the tracked vehicle with respect to the tracked vehicle, said track configured to advance the tracked vehicle,
acquire a signal indicative of a longitudinal tilt of the tracked vehicle;
determine, based on the acquired signal indicative of the longitudinal tilt of the tracked vehicle, an operating condition; and
responsive to the determined operating condition being deterministic of an anti-skid operating mode:
for the determined operating condition, calculate a range of expected traveling speeds as a function of acquired speed of the track, wherein a first determined operating condition associated with an ascent of the tracked vehicle has a first range of expected travelling speeds as a function of the acquired speed of the track and a second, different determined operating condition associated with a descent of the tracked vehicle has a second, greater range of expected travelling speeds as a function of the acquired speed of the track, and
cause a varying of the speed of the track when the traveling speed of the tracked vehicle is outside the calculated range of expected traveling speeds to reduce slippage of the track.

12. The tracked vehicle control device of claim 11, wherein when executed by the processor, the plurality of instructions cause the processor to:
acquire a speed of each of two tracks of the tracked vehicle, said two tracked configured to be driven at respective speeds with respect to the tracked vehicle, and
calculate the range of expected traveling speeds as a function of the acquired speeds of the tracks.

13. The tracked vehicle control device of claim 12, wherein when executed by the processor, the plurality of instructions cause the processor to:
acquire a steering signal adapted to differentiate the speeds of the tracks from one another; and
calculate the range of expected traveling speeds as a function of the acquired steering signal.

14. The tracked vehicle control device of claim 11, wherein when executed by the processor, the plurality of instructions cause the processor to calculate the range of expected traveling speeds as a function of the acquired signal indicative of longitudinal tilt.

15. The tracked vehicle control device of claim 11, wherein when executed by the processor, the plurality of instructions cause the processor to cyclically reiterate the calculation of the range of expected traveling speeds.

16. The tracked vehicle control device of claim 11, which includes a sensor mountable on the tracked vehicle and configured to:
detect a relative movement of the track with respect to the tracked vehicle, and
acquire the speed of the track.

17. The tracked vehicle control device of claim 11, which includes a GPS receiver mountable on the tracked vehicle and configured to acquire the traveling speed of the tracked vehicle.

18. The tracked vehicle control device of claim 11, wherein when executed by the processor, the plurality of instructions cause the processor to:
respectively adjust a first power transmission of the tracked vehicle and a second power transmission of the tracked vehicle to modulate power transmitted to respective tracks of the tracked vehicle via a tracked vehicle motor, and
vary the respective speeds of the tracks.

19. A ski run tracked vehicle comprising:
a track configured to advance the ski run tracked vehicle; and
a tracked vehicle control device including:
a processor; and
a memory device which stores a plurality of instructions, which when executed by the processor, cause the processor to:
acquire a traveling speed of the ski run tracked vehicle,
acquire a speed of the track with respect to the ski run tracked vehicle,
acquire a signal indicative of a longitudinal tilt of the ski run tracked vehicle;
determine, based on the acquired signal indicative of the longitudinal tilt of the ski run tracked vehicle, an operating condition; and
responsive to the determined operating condition being deterministic of an anti-skid operating mode:
for the determined operating condition, calculate a range of expected traveling speeds as a function of acquired speed of the track, wherein a first determined operating condition associated with an ascent of the ski run tracked vehicle has a first range of expected travelling speeds as a function of the acquired speed of the track and a second, different determined operating condition associated with a descent of the ski run tracked vehicle has a second, greater range of expected travelling speeds as a function of the acquired speed of the track, and
cause a varying of the speed of the track when the traveling speed of the ski run tracked vehicle is outside the calculated range of expected traveling speeds to reduce slippage of the track.

20. A woods maintenance tracked vehicle comprising:
a track configured to advance the woods maintenance tracked vehicle; and a tracked vehicle control device including:
a processor; and
a memory device which stores a plurality of instructions, which when executed by the processor, cause the processor to:
acquire a traveling speed of the woods maintenance tracked vehicle,
acquire a speed of the track with respect to the woods maintenance tracked vehicle,
acquire a signal indicative of a longitudinal tilt of the woods maintenance tracked vehicle;
determine, based on the acquired signal indicative of the longitudinal tilt of the woods maintenance tracked vehicle, an operating condition; and
responsive to the determined operating condition being deterministic of an anti-skid operating mode:
for the determined operating condition, calculate a range of expected traveling speeds as a function of acquired speed of the track, wherein a first determined operating condition associated with an ascent of the woods maintenance tracked vehicle has a first range of expected travelling speeds as a function of the acquired speed of the track and a second, different determined operating condition associated with a descent of the woods maintenance tracked vehicle has a second, greater range of expected travelling speeds as a function of the acquired speed of the track, and
cause a varying of the speed of the track when the traveling speed of the woods maintenance tracked vehicle is outside the calculated range of expected traveling speeds to reduce slippage of the track.

* * * * *